(12) United States Patent
Friedrich et al.

(10) Patent No.: US 10,890,214 B2
(45) Date of Patent: Jan. 12, 2021

(54) METHOD FOR ATTACHING A BEARING CARRIER AND ASSEMBLY

(71) Applicant: Aktiebolaget SKF, Gothenburg (SE)

(72) Inventors: Hans-Juergen Friedrich, Königsberg-Römershofen (DE); Berthold Beyfuss, Wasserlosen-Kaisten (DE); Alfred Radina, Poppenlauer (DE); Maximilian Soellner, Bundorf (DE); Stefan Volpert, Bergrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 89 days.

(21) Appl. No.: 16/022,102

(22) Filed: Jun. 28, 2018

(65) Prior Publication Data
US 2019/0010986 A1  Jan. 10, 2019

(30) Foreign Application Priority Data
Jul. 10, 2017 (DE) .................. 10 2017 211 792

(51) Int. Cl.
*F16C 33/58* (2006.01)
*F16C 35/067* (2006.01)
*F16C 33/64* (2006.01)

(52) U.S. Cl.
CPC ............ *F16C 33/581* (2013.01); *F16C 33/64* (2013.01); *F16C 35/067* (2013.01); *F16C 2226/52* (2013.01); *F16C 2226/60* (2013.01)

(58) Field of Classification Search
CPC .. F16B 39/103; F16C 2226/50; F16C 22/581; F16C 33/64; F16C 35/06; F16C 35/067; F16D 1/072; F16D 1/0858
See application file for complete search history.

(56) References Cited

U.S. PATENT DOCUMENTS

| | | | | |
|---|---|---|---|---|
| 3,771,846 A * | 11/1973 | Bass | ................ | F16C 27/063 384/125 |
| 5,822,837 A * | 10/1998 | Schwellenbach | ....... | B23P 11/02 29/450 |
| 6,470,553 B1 * | 10/2002 | Retzbach | ................ | B23P 11/02 29/450 |
| 7,377,735 B2 * | 5/2008 | Cosenza | ............... | F16B 41/002 411/353 |

(Continued)

FOREIGN PATENT DOCUMENTS

| | | | | |
|---|---|---|---|---|
| DE | 20019278 U1 * | 4/2001 | ............ | F16C 33/586 |
| DE | 10355363 A1 * | 6/2005 | ............ | F16C 33/586 |

(Continued)

*Primary Examiner* — Jacob J Cigna
(74) *Attorney, Agent, or Firm* — J-Tek Law PLLC; Scott T. Wakeman; Mark A. Ussai

(57) ABSTRACT

A method for attaching a bearing carrier having an opening to an outer ring of a bearing includes placing the bearing carrier against a first body that is not the outer ring of the bearing, pressing the first body against a first location on the bearing carrier with a force having a radial component to increase a width of the opening of the bearing carrier, placing the opening of the bearing carrier on the outer ring of the bearing while maintaining the force, and releasing the force after placing the bearing carrier on the outer ring.

13 Claims, 3 Drawing Sheets

(56) References Cited

U.S. PATENT DOCUMENTS

| | | | | |
|---|---|---|---|---|
| 7,967,512 B2* | 6/2011 | Himeda | ................ | F16C 33/586 |
| | | | | 384/539 |
| 8,448,430 B2* | 5/2013 | Fukami | ................... | F16C 19/30 |
| | | | | 384/621 |
| 9,222,518 B2* | 12/2015 | Beyfuss | ................ | F16C 35/067 |
| 2009/0052826 A1* | 2/2009 | Himeda | ................ | F16C 33/586 |
| | | | | 384/515 |
| 2010/0058750 A1* | 3/2010 | Fukami | ................... | F16C 19/30 |
| | | | | 60/330 |
| 2010/0220949 A1* | 9/2010 | Baier | ................... | F16C 33/586 |
| | | | | 384/511 |
| 2014/0064651 A1* | 3/2014 | Beyfuss | ................ | F16C 33/586 |
| | | | | 384/536 |

FOREIGN PATENT DOCUMENTS

| | | | | | |
|---|---|---|---|---|---|
| DE | 102004053078 A1 | * | 5/2006 | ............ | F16C 35/067 |
| GB | 1235791 A | * | 6/1971 | .............. | F16C 33/58 |
| JP | 60014616 A | * | 1/1985 | ............ | F16C 35/077 |
| JP | 09144731 A | * | 6/1997 | ............ | F16C 35/067 |
| JP | 2013137071 A | * | 7/2013 | ............ | F16C 33/586 |

\* cited by examiner

METHOD FOR ATTACHING A BEARING CARRIER AND ASSEMBLY

CROSS-REFERENCE

This application claims priority to German patent application no. 10 2017 211 792.3 filed on Jul. 10, 2017, the contents of which are fully incorporated herein by reference.

TECHNOLOGICAL FIELD

The disclosure is directed to a method for attaching a bearing carrier to an outer ring of a bearing.

BACKGROUND

A method of attaching a bearing carrier to an outer ring of a bearing is known from DE 10 2004 031 830 A1. That method involves placing a bearing carrier on a shoulder of an outer ring of a bearing and then attaching the bearing carrier to the outer ring by forming protrusions on the bearing carrier during a caulking step so that the protrusions protrude radially inward into a groove of the outer ring.

SUMMARY

An aspect of the disclosure is a method of attaching a bearing carrier to a bearing with high efficiency.

In a first step of the disclosed method, a first force acts on the bearing carrier via a component that differs from the outer ring, and the first force includes at least one component that points in a first radial direction of the bearing carrier, and simultaneously at least one second force acts on the bearing carrier, wherein there is a second radial direction of the bearing carrier along which in a first state, wherein the forces act on the bearing carrier, a maximum extension length of the bearing carrier is greater than in a second state wherein no forces act on the bearing carrier. "Bearing carrier" shall be understood in particular to be a component which, in an installed state, can directly support forces of a bearing, wherein the component is preferably configured one-piece. "One-piece" shall be understood in particular to mean from one casting and/or from one injection and/or only separable by destruction. According to the invention a high efficiency of the method is achieved. In particular it can be achieved that protrusions or lugs that are to engage in a groove of the outer ring do not need to be formed while the bearing carrier abuts on the outer ring, whereby costs for a tool that would be needed for generating such protrusions or lugs can be saved, and in addition wear of this tool is avoided, which saves further costs. In particular if the bearing carrier is made of steel it is thereby also possible to harden the bearing carrier after introducing the protrusions or lugs so that the protrusions or lugs are introducible in a state wherein the bearing carrier is unhardened, which minimizes tool wear. In particular it can also be achieved that with the attaching of the bearing carrier onto the outer ring only very small forces act on the bearing and the outer ring.

Another aspect of the disclosure comprises a method for attaching a bearing carrier having an opening to an outer ring of a bearing, the outer ring of the bearing having a groove and the opening of the bearing carrier having a width. The method includes caulking the bearing carrier at a first location and a second location to produce a first projection and a second projection extending radially inwardly from the opening of the bearing carrier such that the first projection is spaced from the second projection by a distance less than a diameter of the outer ring, and, after caulking the bearing carrier, placing the first projection into the groove. The method also includes, with the first projection in the groove, applying a radial force against an outer surface of the bearing carrier to compress the bearing carrier in a first direction and increase the width of the bearing carrier in a second direction so that the first projection is spaced from the second projection by a distance greater than the diameter of the outer ring. Then, without releasing the radial force, the second projection is aligned with the groove and with the second projection aligned with the groove, releasing the force so that the second projection moves into the groove.

Furthermore an assembly including a bearing and a bearing carrier, which is attached onto the outer ring of the bearing, is disclosed, wherein at least one protrusion, which starting from a boundary of an opening of the bearing carrier, which surrounds a radial outer region of the outer ring, extends radially inward into an opening on a radial outer side of the outer ring, wherein the protrusion is disposed on a projection of the boundary that extends radially inward starting from the boundary region surrounding it. An efficient attachability of the bearing carrier onto the outer ring can thereby be achieved. In particular the projection can be essentially circle-segment-shaped.

Further advantages arise from the following description of the drawings. An exemplary embodiment of the invention is depicted in the drawings. The drawings, the description, and the claims contain numerous features in combination. The person skilled in the art will also advantageously consider the features individually and in further meaningful combinations.

DETAILED DESCRIPTION

Figure 7:
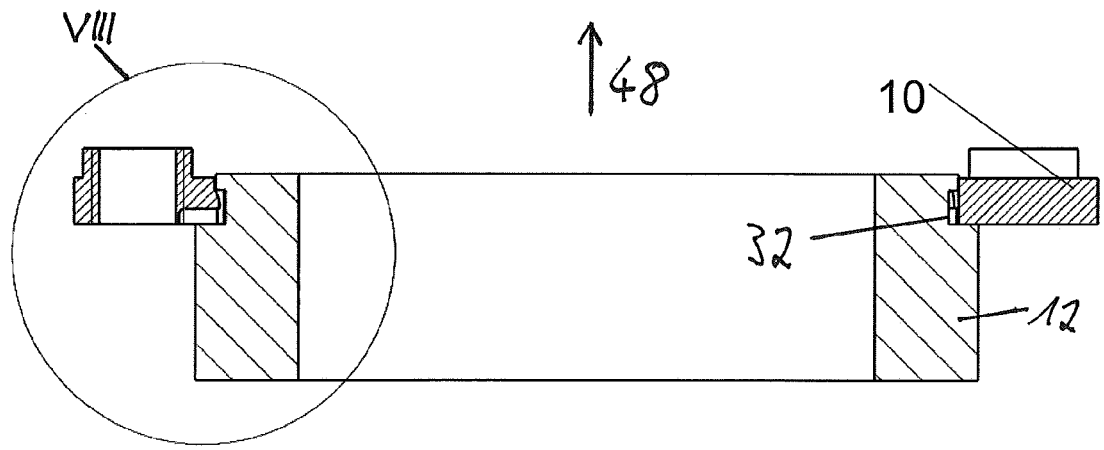
FIG. 7 shows a longitudinal section through the bearing carrier and the outer ring in a state wherein the bearing carrier is attached onto the outer ring.
Figure 8:
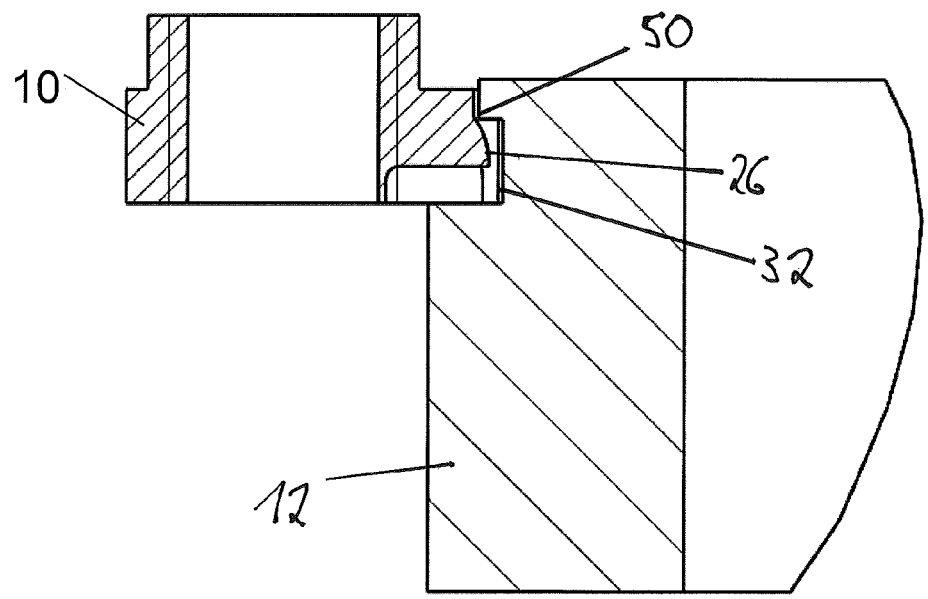
FIG. 8 shows a detail from FIG. 7.

FIG. 7 shows an inventive assembly including a bearing carrier 10, which is attached onto an outer ring 12 of a bearing. Only the outer ring of the bearing is schematically depicted in FIGS. 5 to 8. The bearing carrier 10 includes an opening 22 (FIG. 1) that surrounds a radial outer surface 24 of the outer ring. A boundary 20 of the opening 22 includes a projection 40 that extends radially inward starting from the boundary region surrounding it. The projection 40 is a region 38 that is configured circle-segment-shaped. Furthermore, the bearing carrier 10 includes a further region 39, which is also configured circle-segment-shaped. The bearing carrier 10 also includes three protrusions 26, 28, 30 that each extend radially inward starting from the boundary 20. The protrusion 26 is disposed on the region 39. The protrusions 28 and 30 are disposed on the projection 40. The protrusion 28 protrudes farther radially inward than the region 39. Furthermore, the protrusions 28, 30 protrude farther radially inward than the projection 40. At its radial outer side the outer ring includes an opening 32 that is formed by a groove, which extends over the entire circumference of the outer ring. The protrusions 26, 28, 30 protrude into the groove, whereby when the outer ring is at rest the bearing carrier cannot be removed from the outer ring by a movement in the axial direction 48 of the outer ring. The protrusions 26, 28, 30 and the groove therefore effect an interference-fit attaching of the bearing carrier onto the outer ring. The assembly can be part of a transmission of a motor vehicle, in particular of an automobile.

Figure 1:
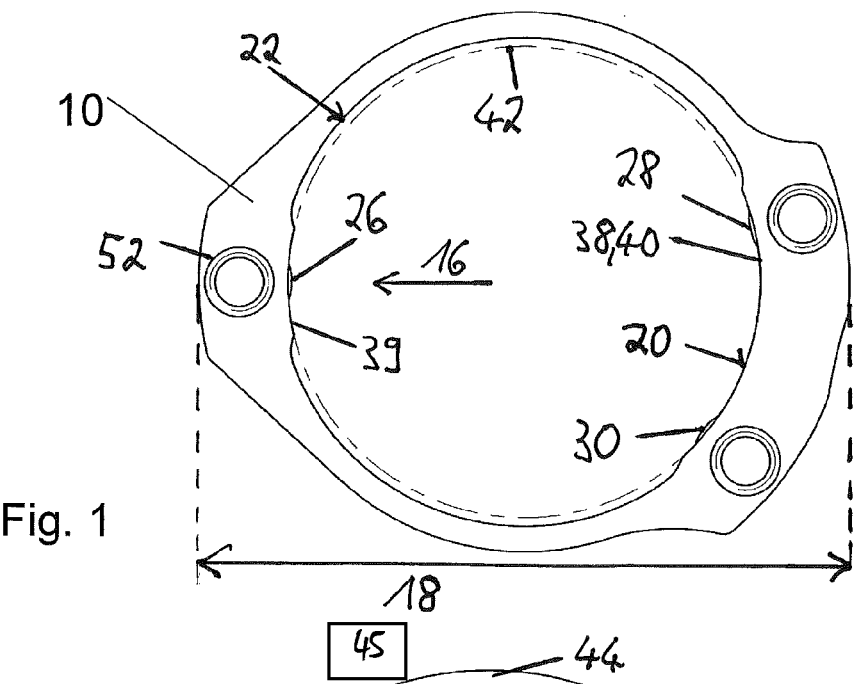
FIG. 1 shows a plan view of a top side of a bearing carrier in a state wherein no force acts on the bearing carrier.
Figure 2:
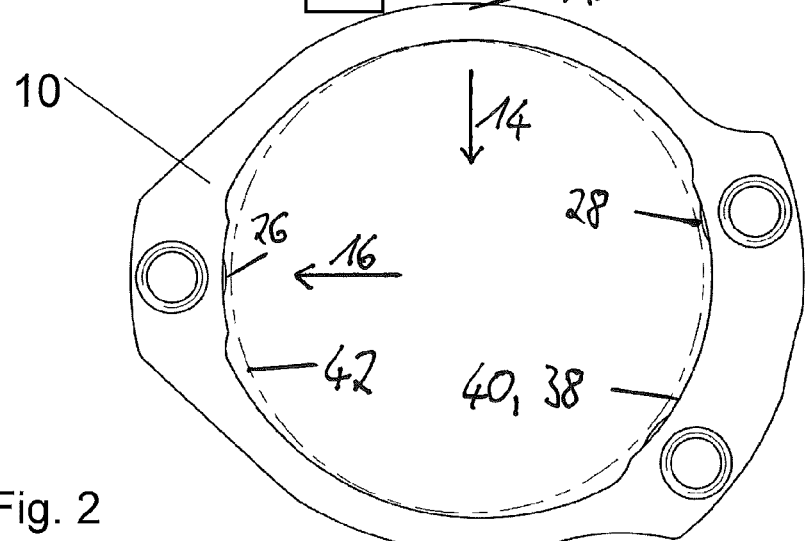
FIG. 2 shows a plan view of the top side of the bearing carrier wherein it is compressed.
Figure 3:
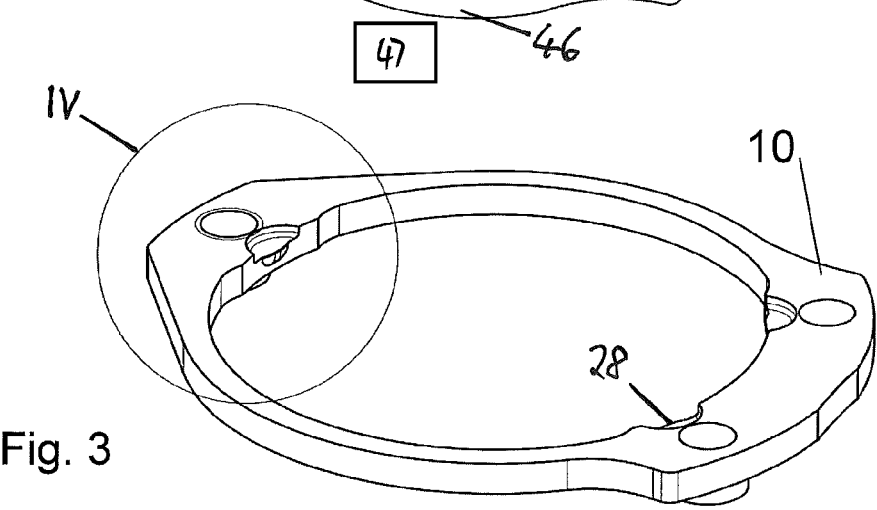
FIG. 3 shows a perspective view of the bearing carrier in the state according to FIG. 1.
Figure 4:
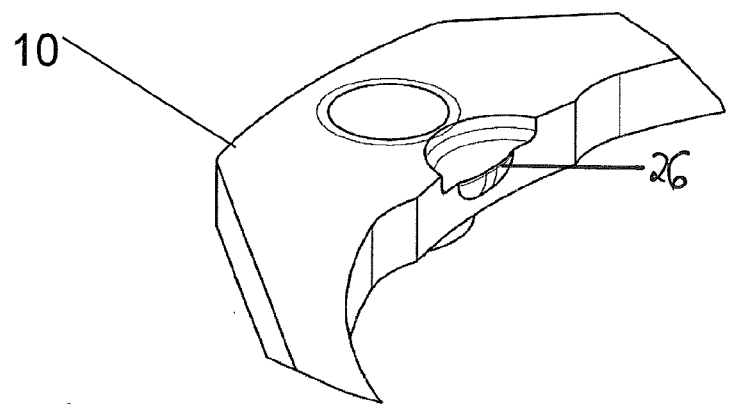
FIG. 4 shows a detail from FIG. 3.
Figure 5:
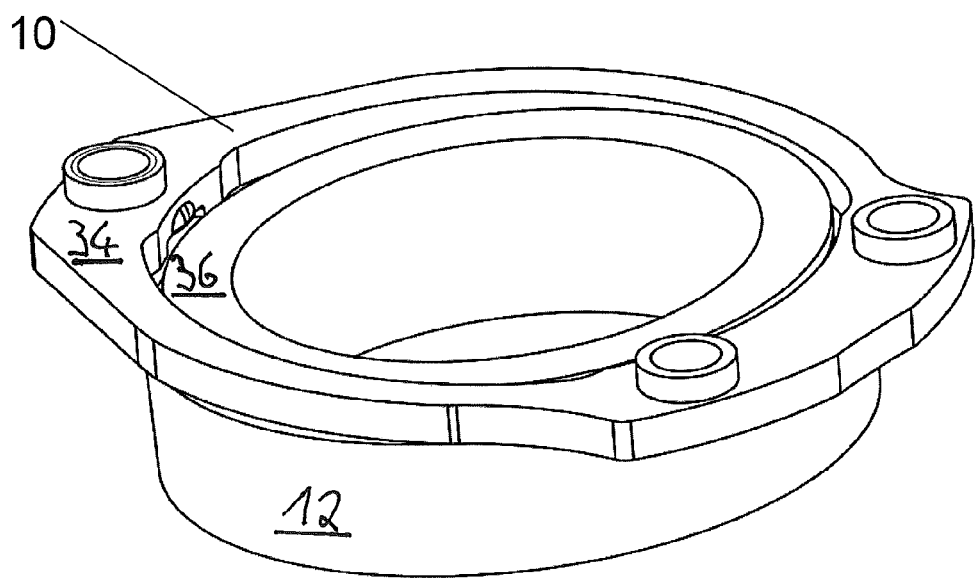
FIG. 5 shows the bearing carrier and an outer ring of a bearing during an installing of the bearing carrier onto the outer ring.
Figure 6:
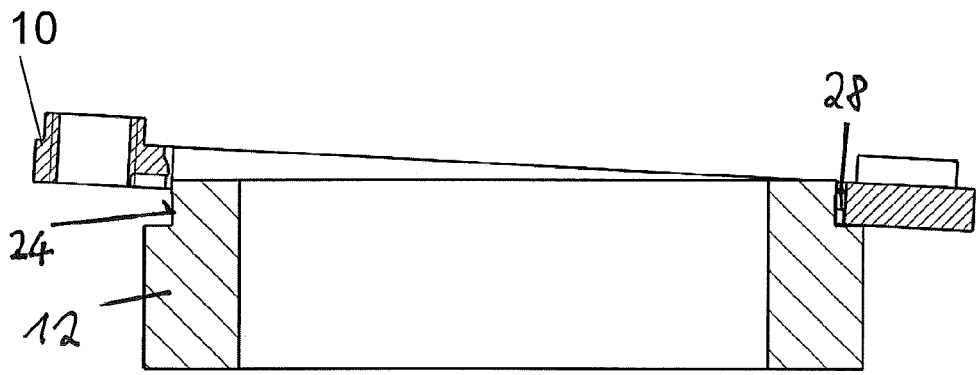
FIG. 6 shows a longitudinal section through the bearing carrier and the outer ring in the state according to FIG. 5.

In the following it is described how the bearing carrier is attached onto the outer ring. FIG. 1 shows the bearing carrier in a state wherein no forces act on it. In FIG. 1 a circle 42 indicates a circumference of an edge region 50 of the groove. Since the bearing carrier includes the protrusions 26, 28, the bearing carrier cannot be brought into an end position, depicted in FIG. 7, relative to the outer ring without expenditure of force. Therefore the two protrusions 28, 30 are first introduced into the opening 32. Here the protrusion 26 is not disposed in the opening 32, with the result that an end surface 34 of the bearing carrier is oblique to an end surface 36 of the outer ring (FIG. 5). In order to now also dispose the protrusion 26 in the opening 32, in a method step a first force is exerted on the bearing carrier at a first impingement region 44 of the bearing carrier using a first body 45, which force points in a radial direction 14 of the bearing carrier. Simultaneously a second force is exerted onto the bearing carrier at a second impingement region 46 using a second body 47, which force points in a direction that opposes the radial direction 14. The first body 45 and the second body 47 may be, for example, opposite jaws of a clamp. Alternately, the second body 47 may be a fixed surface against which the bearing carrier 10 is pressed by a movable first body 45. Due to the acting of the two forces, a maximum extension length 18 of the bearing carrier increases along a radial direction 16 of the bearing carrier, which is perpendicular to the radial direction 14. The influence of the two forces further causes a distance between the protrusion 26 and the protrusion 28, and a distance between the protrusion 26 and the protrusion 30 to increase. The protrusion 26 can thereby be moved toward the outer ring against the axial direction 48 until the region 39 abuts on the outer ring. When the region 39 abuts on the outer ring the influence of the two forces is suppressed, with the result that the maximum extension length 18 is reduced and the protrusion 26 also moves into the opening 32. The bearing carrier is thus completely attached onto the outer ring.

The bearing can be, for example, a ball bearing.

The first and the second force are each exerted on the bearing carrier by a metal block.

The bearing carrier is formed one-piece from a metal plate and includes three threaded passages 52, using which the bearing carrier can be attached, for example, onto a housing. The protrusions 26, 28, 30 are each formed by caulking prior to attaching the bearing carrier onto the outer ring. The caulkings can therefore be introduced into the metal plate wherein the metal plate is not yet hardened. Thus only slight wear of a tool occurs, using which tool the caulking is carried out, and there is also no risk of crack formations on the bearing carrier. In one exemplary embodiment it is also conceivable that the bearing carrier is not hardened even after introducing the caulkings.

The protrusions are disposed on the boundary of the opening 22.

The region 39 has the shape of a circle segment that extends over less than 30°. In addition the region 38 has the shape of a circle segment that extends over less than 80°. The two regions 38, 39 determine the radial clearance that the outer ring has relative to the bearing carrier. The forces that are exerted on the outer ring during the attaching of the bearing carrier only effect an elastic deformation of the bearing carrier.

In an alternative exemplary embodiment the maximum extension length 18 is enlarged such that the bearing carrier is pulled apart at two points that are respectively disposed at 90° with respect to the impingement regions 44, 46 along a circumferential direction of the bearing carrier. Thus an enlarging of the distance between the protrusions 26 and 28 and the protrusions 26 and 30 is also achieved as desired.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods of attaching bearing carriers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Bearing carrier
12 Outer ring
14 Radial direction
16 Radial direction
18 Extension length
20 Boundary
22 Opening
24 Outer surface
26 Protrusion
28 Protrusion
30 Protrusion
32 Opening
34 End surface
36 End surface
38 Region
39 Region 40 Projection
42 Circle
44 Impingement region
45 First body
46 Impingement region
47 Second body
48 Axial direction
50 Edge region
52 Threaded passage

What is claimed is:

1. A method for attaching a bearing carrier having an opening to an outer ring of a bearing, the method comprising:
   placing the bearing carrier against a first body, wherein the first body is not the outer ring of the bearing,
   pressing the first body against a first location on the bearing carrier with a force having a radial component to increase a width of the opening of the bearing carrier,
   placing the opening of the bearing carrier on the outer ring of the bearing while maintaining the force, and
   releasing the force after placing the bearing carrier on the outer ring.

2. The method according to claim 1, including placing the bearing carrier against a second body that is not the outer ring of the bearing such that the pressing compresses the bearing carrier between the first body and the second body.

3. The method according to claim 1, including placing the bearing carrier against a second body that is not the outer ring of the bearing such that the pressing stretches the opening of the bearing carrier.

4. The method according to claim 1,
   wherein the outer ring of the bearing includes a groove, the method further comprising:
   caulking the bearing carrier at a first location and a second location to produce a first projection and a second projection extending radially inwardly from the opening of the bearing carrier such that the first projection is spaced from the second projection by a distance less than a diameter of the outer ring,
   after caulking the bearing carrier, placing the first projection into the groove; and
   aligning the second projection with the groove before releasing the force.

5. The method according to claim 1, including forming at least two radially inwardly extending protrusions on an edge of the opening of the bearing carrier before pressing the first body against the first location.

6. The method according to claim 5, wherein the first one of the at least two protrusions is formed on a region of the bearing carrier that is substantially circle-segment-shaped.

7. The method according to claim 5, wherein the pressing increases a distance between a first one of the at least two protrusions and a second one of the at least two protrusions.

8. The method according to claim 7, including introducing the first one of the at least two protrusions into an opening on a radially outer surface of the outer ring.

9. The method according to claim 8, wherein during the introducing an end surface of the bearing carrier is oblique to an end surface of the outer ring.

10. A method for attaching a bearing carrier having an opening to an outer ring of a bearing, the outer ring of the bearing having a groove and the opening of the bearing carrier having a width, the method comprising:
    forming a first radially inwardly extending projection at a first location on the opening and a second radially inwardly extending projection at a second location on the opening such that the first projection is spaced from the second projection by a distance less than a diameter of the outer ring,
    after forming the first and second projections, placing the first projection into the groove;
    with the first projection in the groove, applying a radial force against an outer surface of the bearing carrier to compress the bearing carrier in a first direction and increase the width of the bearing carrier in a second direction so that the first projection is spaced from the second projection by a distance greater than the diameter of the outer ring,
    without releasing the radial force, aligning the second projection with the groove, and
    with the second projection aligned with the groove, releasing the force so that the second projection moves into the groove.

11. The method according to claim 10 wherein forming the first radially inwardly extending projection comprises caulking the bearing carrier to form the first radially inwardly extending projection.

12. The method according to claim 11, wherein the bearing carrier includes a third projection and including placing the third projection into the groove before applying the radial force.

13. The method according to claim 11, wherein applying the radial force against an outer surface of the bearing carrier comprises applying the radial force using a body different than the bearing outer ring.

* * * * *